United States Patent [19]

Peahl

[11] Patent Number: 5,050,399

[45] Date of Patent: Sep. 24, 1991

[54] AUTOMOTIVE COOLER APPARATUS

[76] Inventor: Christopher J. Peahl, Coot Bay Rd. RR 3, Box 800, Rindge, N.H. 03461

[21] Appl. No.: 559,679

[22] Filed: Jul. 23, 1990

[51] Int. Cl.$^5$ .............................................. B60H 1/32
[52] U.S. Cl. ..................................... 62/244; 62/457.4
[58] Field of Search .............................. 62/244, 457.4

[56] References Cited

U.S. PATENT DOCUMENTS

| | | | |
|---|---|---|---|
| 3,916,639 | 11/1975 | Atkinson | 62/244 X |
| 4,183,226 | 1/1980 | Moore | 62/457.4 |
| 4,882,914 | 11/1989 | Haines-Keeley | 62/457.4 |
| 4,892,137 | 1/1990 | Bibik, Jr. | 62/244 X |
| 4,892,138 | 1/1990 | Bibik, Jr. | 62/244 X |

Primary Examiner—Lloyd L. King
Attorney, Agent, or Firm—Leon Gilden

[57] ABSTRACT

An apparatus for use particularly within an automotive environment, including a central support container for securement of a plurality of chambers therewithin, wherein each chamber provides reception of a predetermined quantity of a refrigerant gel or fluid. The support container includes a "U" shaped support base, including a plurality of upstanding extending arcuate legs for surmounting a transmission tunnel housing of an associated automobile. A modification of the invention includes the support container including an elongate cavity to complementarily receive a plurality of insert holder chambers, wherein each chamber includes an insert cavity, each cavity containing a deformable refrigerant chamber. Each refrigerant chamber includes a through-extending cylindrical bore to receive a beverage container therewithin.

1 Claim, 4 Drawing Sheets

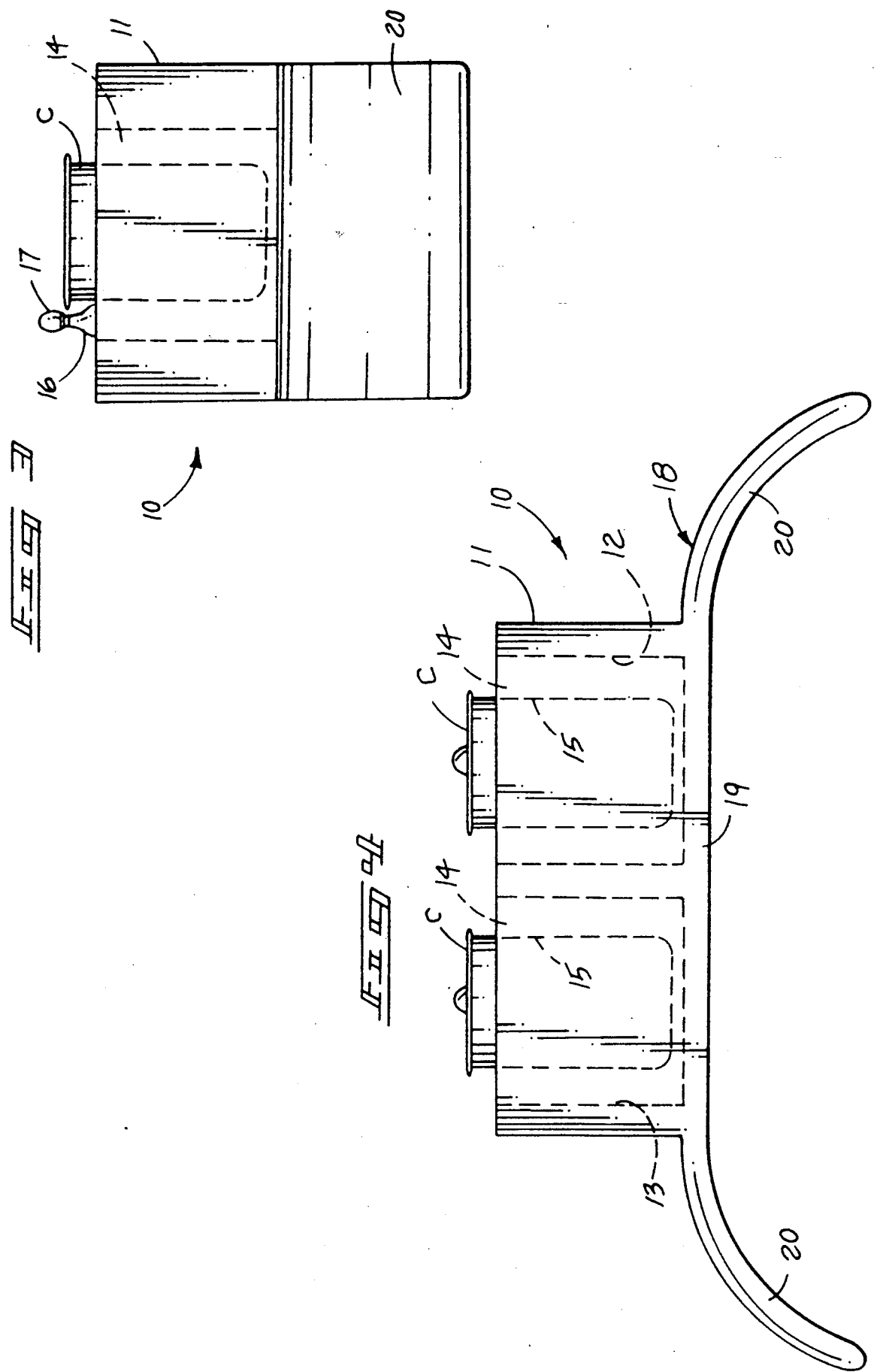

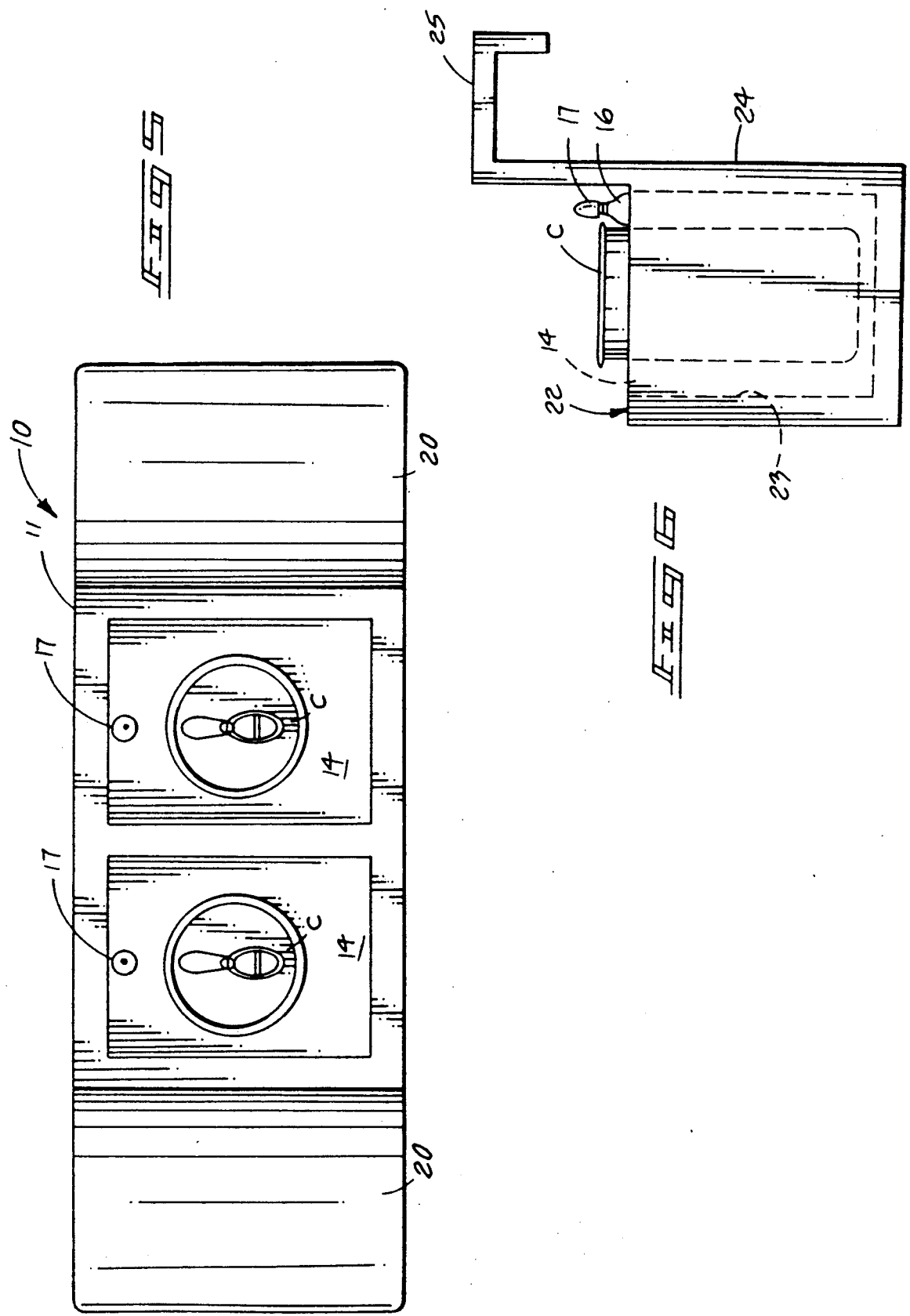

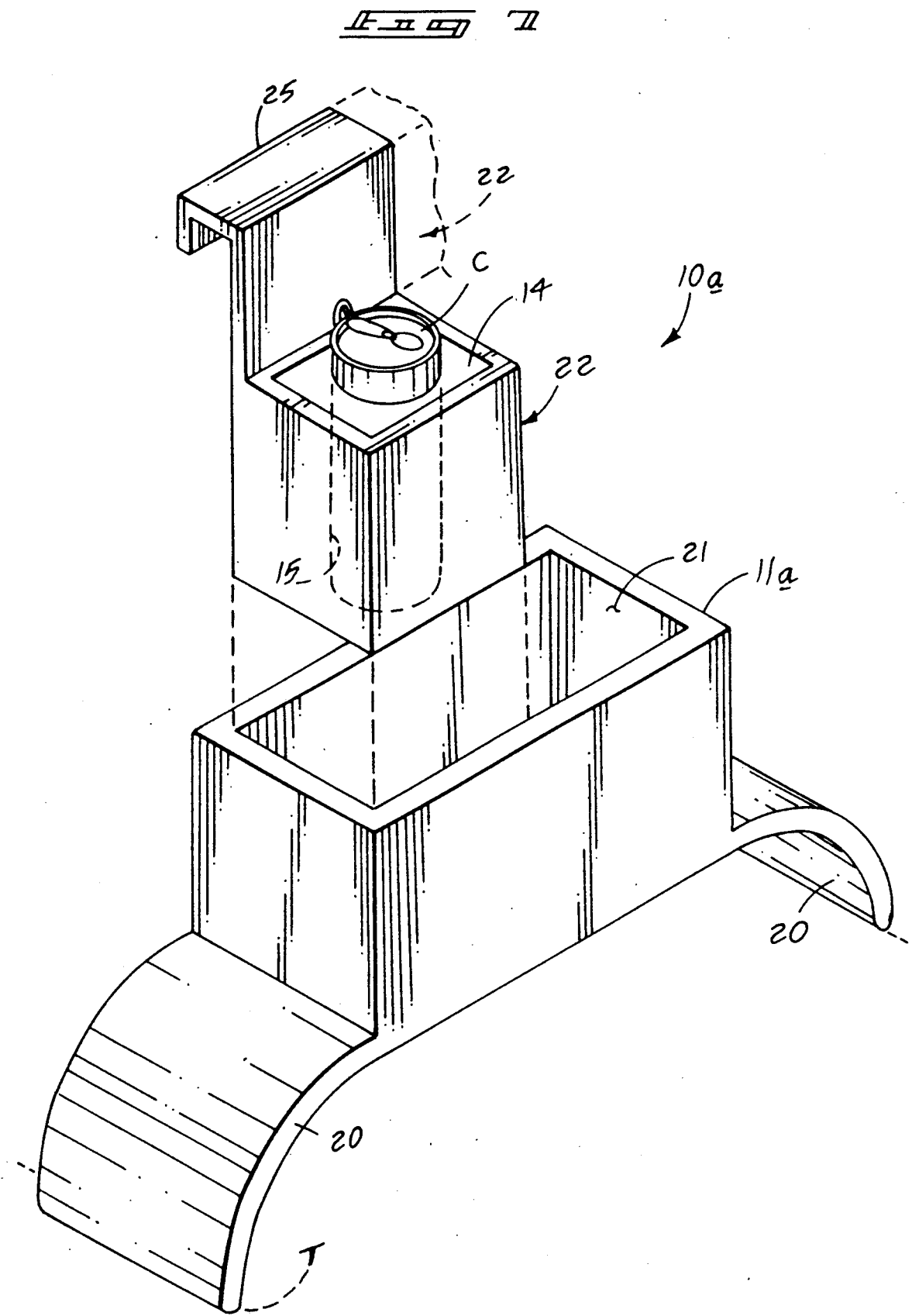

AUTOMOTIVE COOLER APPARATUS

BACKGROUND OF THE INVENTION

1. Field of the Invention

The field of invention relates to refrigerant containers, and more particularly pertains to a new and improved automotive cooler apparatus wherein the same permits ease of transport and storage of beverage containers therewithin.

2. Description of the Prior Art

The use of refrigerant containers to maintain beverages at refrigerated conditions to enhance consumption of such beverages are known in the prior art. The prior art structure has heretofore failed to provide the convenience and organization as set forth by the instant invention to permit the beverage containers secured within an automotive environment to be easily and readily manipulated within the automotive environment. Examples of the prior art includes U.S. Pat. No. 4,478,052 to McDowell wherein a food storage compartment is mounted within an automotive environment and mounted upon a door assembly, with a conduit for pneumatic association with a heater/air conditioning system of the automobile.

U.S. Pat. No. 4,554,798 to D'Amour, et al. provides a member formed with apertures therethrough to contain the refrigerant material to permit securement about various containers to be refrigerated.

U.S. Pat. No. 4,607,502 to Tomac provides a device for containing a plurality of bottles or containers therewithin arranged in a wrapping utilizing a cooling medium formed therewithin.

U.S. Pat. No. 4,819,793 to Willard sets forth a beverage carrier including a housing, with a refrigerant mounted within the housing to enhance cooling of containers therewithin.

U.S. Pat. No. 4,344,301 to Taylor utilizes a beverage cooler construction, wherein a matrix of containers are secured within a package having thermal insulative properties.

As such, it may be appreciated that there continues to be a need for a new and improved automotive cooler apparatus which addresses both the problems of ease of use as well effectiveness in construction and in this respect, the present invention substantially fulfills this need.

SUMMARY OF THE INVENTION

In view of the foregoing disadvantages inherent in the known types of automotive cooler apparatus now present in the prior art, the present invention provides an automotive cooler apparatus wherein the same provides for storage of containers and refrigeration of such containers within an automotive environment. As such, the general purpose of the present invention, which will be described subsequently in greater detail, is to provide a new and improved automotive cooler apparatus which has all the advantages of the prior art automotive cooler apparatus and none of the disadvantages.

To attain this, the present invention provides an apparatus for use particularly within an automotive environment, including a central support container for securement of a plurality of chambers therewithin, wherein each chamber provides reception of a predetermined quantity of a refrigerant gel or fluid. The support container includes a "U" shaped support base, including a plurality of upstanding extending arcuate legs for sur-mounting a transmission tunnel housing of an associated automobile. A modification of the invention includes the support container including an elongate cavity to complmenetarily receive a plurality of insert holder chambers, wherein each chamber includes an insert cavity, each cavity containing a deformable refrigerant chamber. Each refrigerant chamber includes a through-extending cylindrical bore to receive a beverage container therewithin.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved automotive cooler apparatus which has all the advantages of the prior art automotive cooler apparatus and none of the disadvantages.

It is another object of the present invention to provide a new and improved automotive cooler apparatus which may be easily and efficiently manufactured and marketed.

It is a further object of the present invention to provide a new and improved automotive cooler apparatus which is of a durable and reliable construction.

An even further object of the present invention is to provide a new and improved automotive cooler apparatus which is susceptible of a low cost of manufacture with regard to both materials and labor, and which accordingly is then susceptible of low prices of sale to the consuming public, thereby making such automotive cooler apparatus economically available to the buying public.

Still yet another object of the present invention is to provide a new and improved automotive cooler apparatus which provides in the apparatuses and methods of the prior art some of the advantages thereof, while simultaneously overcoming some of the disadvantages normally associated therewith.

Still another object of the present invention is to provide a new and improved automotive cooler apparatus wherein the same permits selective securement within a plurality of locations within an automotive environment of beverage containers.

These together with other objects of the invention, along with the various features of novelty which characterize the invention, are pointed with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic side view, taken in elevation, of the instant invention.

FIG. 4 is an orthographic frontal view, taken in elevation, of the instant invention.

FIG. 5 is an orthographic top view of the instant invention.

FIG. 6 is an orthographic side view of one of a plurality of insert holders for use in a modification of the instant invention.

FIG. 7 is an isometric illustration of a modification of the instant invention for use with a plurality of the insert holders such as illustrated in FIG. 6.

DESCRIPTION OF THE PREFERRED EMBODIMENT

Figure 1:
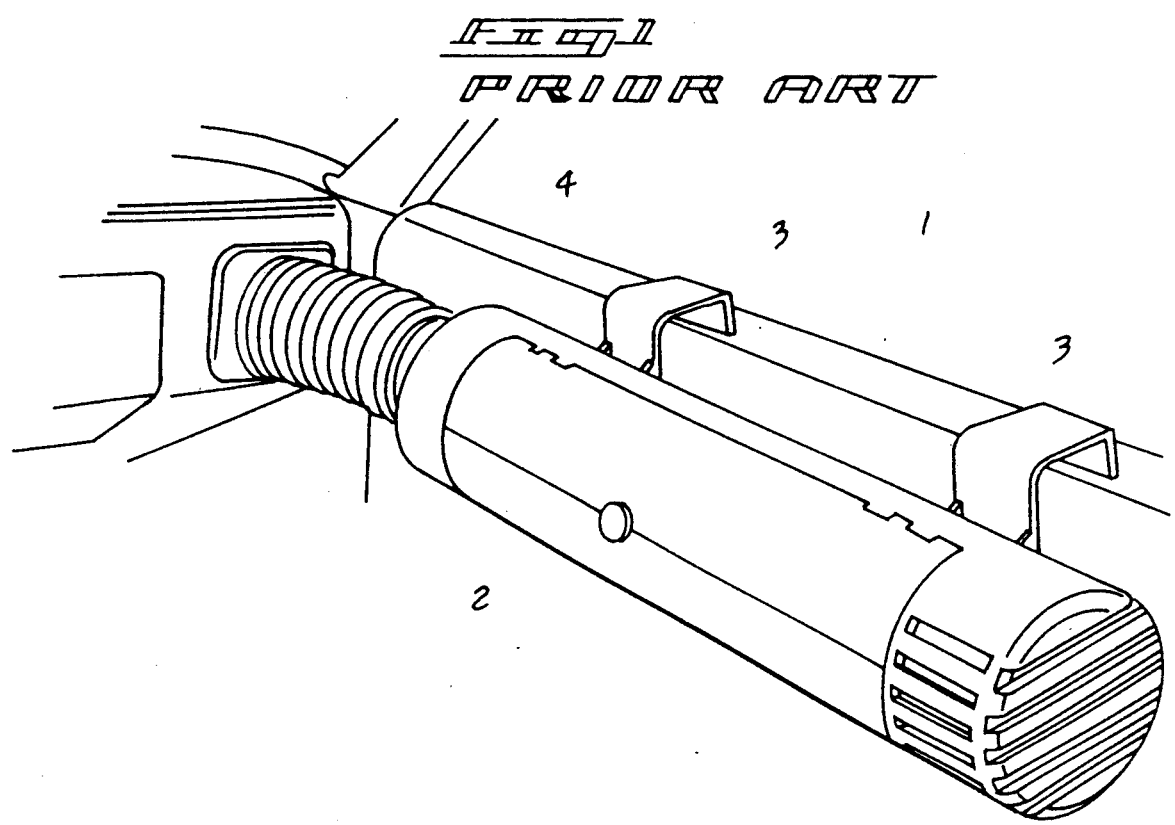
FIG. 1 is an isometric illustration of a prior art automotive cooler apparatus.

With reference now to the drawings, and in particular to FIGS. 1 to 7 thereof, a new and improved automotive cooler apparatus embodying the principles and concepts of the present invention and generally designated by the reference numeral 10 will be described.

Figure 2:
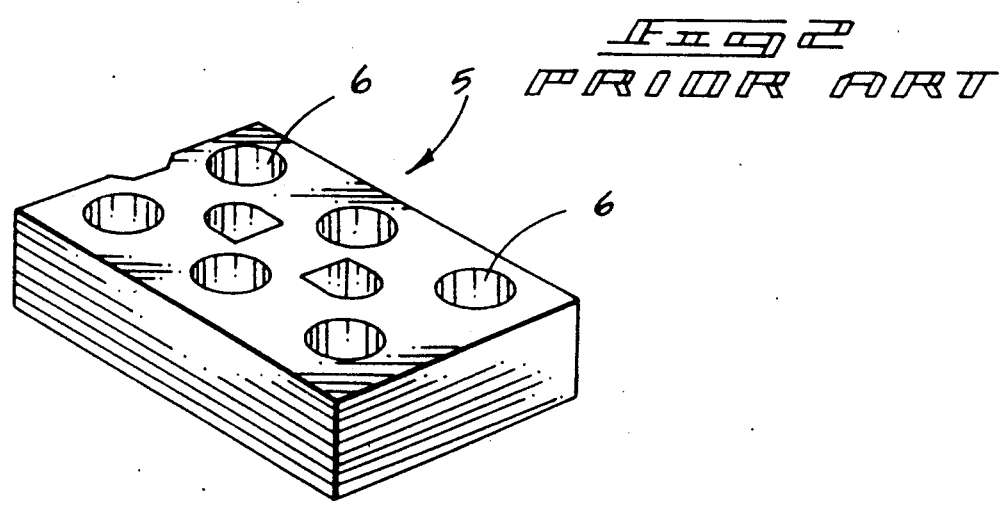
FIG. 2 is an isometric illustration of a further prior art beverage cooler apparatus.

FIG. 1 illustrates a prior art automotive cooler apparatus 1, wherein an elongate tubular housing 2 includes a cavity therewithin in operative association with a plurality of hangers 3, and a conduit 4 that is associated with the heating/air conditioning system of an associated automobile. FIG. 2 illustrates a further prior art cooler apparatus 5, wherein a plurality of through-extending bores 6 directed through a central chamber containing a refrigerant therewithin is arranged for receiving various beverage containers through the aperture 6.

More specifically, the automotive cooler apparatus 10 of the instant invention essentially comprises a support container 11, the support container 11 including a first and second support container cavity 12 and 13 arranged in aligned spaced relationship within the elongate support container 11 to each receive a respective deformable refrigerant chamber. The refrigerant chamber contains a predetermined quantity of a freezable gel or suitable refrigerant directed within the chamber by a respective fill conduit 16 in fluid communication with each refrigerant chamber, wherein each fill conduit includes a threaded fill nozzle and associated closure cap 17. Each chamber 14 includes a through-extending cylindrical bore 15, wherein a predetermined quantity of refrigerant directed within a chamber determines to a degree a combination of an associated container "C" to be received within each cylindrical bore 15. The support container 11 includes and is integrally mounted to a "U" shaped support base 18, wherein the "U" shaped support base 18 includes a central platform 19 defining a floor of the support container 11, wherein the platform 19 includes an arcuate 20 extending outwardly from each opposed end of the platform 11 to define the "U" shaped support base. The arcuate legs 20 accordingly are arranged to overlie an automotive transmission tunnel housing "T" (see FIG. 7 for example) and positioning the support base 18 thereon. The arcuate legs 20 are formed of a biased memory retentent material to enhance frictional engagement with the tunnel "T".

FIG. 7 illustrates the use of a modified cooler apparatus 10a, wherein the modified support container 11a includes a single elongate parallelepiped cavity 21 and is defined by a rectangular wall structure of a predetermined height. A plurality of insert holders 22 of a type as illustrated in FIGS. 6 and 7 are selectively receivable within the cavity 21, wherein each insert holder 22 includes a housing, each housing is defined by a predetermined volume substantially equal to one-half of a predetermined volume defined by the parallelepiped cavity 21. Each insert holder 22 includes an insert cavity 23 contained therewithin. Each insert cavity 23 includes the deformable refrigerant chamber 14 and associated cylindrical bore 15 received therewithin and integrally secured thereto. The refrigerant chambers 14 are filled by the fill nozzles 17, in a manner as set forth above. The side walls 24 of the insert holder 22 are defined by a height equal to the predetermined height to be complementarily received within the elongate cavity 21. Further, the rear side wall includes a "U" shaped hanger 25 extending upwardly and rearwardly of the rear wall to permit selective removal of the insert holder 22 from the cavity 21 for support upon a door member and the like within an automotive environment.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An automotive cooler apparatus for mounting onto an elongate automotive transmission tunnel housing, the apparatus comprising, an elongate support container, the support container defined by spaced side walls including a support container cavity therewithin, the support container cavity defined by a predetermined height, and the support container including a "U" shaped support base defining a concave bottom surface arranged for receiving the transmission tunnel housing, the "U" shaped support base including a central platform defining a floor of the container, and a forward and rear arcuate leg extending outwardly of the central platform at opposed ends of the platform defining a "U" shaped support base, and each arcuate leg formed of a memory retentent material to engage the automotive tunnel housing, and the support container cavity including a plurality of insert holders positionable within the cavity, and wherein the insert holder includes an insert holder container defined by spaced side walls, the side walls defining an insert holder cavity therewithin, and the spaced side walls defined by a predetermined height, and the insert holder cavity including a deformable refrigerant container therewithin for securement of a beverage container, and wherein the deformable refrigerant chamber includes a cylindrical bore medially directed and extending through the refrigerant chamber, the cylindrical bore arranged for reception of the beverage container therewithin, and the deformable refrigerant chamber includes a fill conduit, the fill conduit including a fill nozzle and a closure cap to selectively direct a predetermined quantity of a refrigerant within the refrigerant chamber within each insert holder, and wherein each insert holder container is defined by a predetermined volume, and the support container cavity defined by a support container volume equal to twice the predetermined volume, and wherein each insert holder container includes a rear wall, each rear wall including a "U" shaped hanger extending upwardly and rearwardly of the insert holder container for selective removal and positioning of each insert holder container in a spaced relationship relative to the support container cavity, and wherein the deformable refrigerant chamber is fixedly mounted within each insert holder container cavity.

* * * * *